United States Patent [19]
Chaffin et al.

[11] Patent Number: 5,265,474
[45] Date of Patent: Nov. 30, 1993

[54] STATIC ELECTRICITY RESISTANT ACCELEROMETER PROOF MASS

[75] Inventors: Herbert G. Chaffin, Corona; Gordon S. Norvell, Huntington Beach, both of Calif.

[73] Assignee: Rockwell International Corporation, Seal Beach, Calif.

[21] Appl. No.: 728,414

[22] Filed: Jul. 11, 1991

[51] Int. Cl.⁵ .......................................... G01P 15/125
[52] U.S. Cl. ................................. 73/517 B; 73/517 R; 361/280
[58] Field of Search ......................... 73/517 R, 517 B; 361/280, 283

[56] References Cited

U.S. PATENT DOCUMENTS 3,702,073  11/1972  Jacobs ............................... 73/517 B
4,198,670   4/1980  Mann ................................. 361/283
4,872,342  10/1989  Hanson et al. ..................... 73/517 R Primary Examiner—John E. Chapman
Attorney, Agent, or Firm—H. Frederick Hamann; George A. Montanye; Tom Streeter

[57] ABSTRACT

Static electric charges are removed from the proof mass 10 and support 12 of an accelerometer by covering the proof mass 10 and support 12 with a thin metallic film 36, such as chromium oxide.

6 Claims, 3 Drawing Sheets

STATIC ELECTRICITY RESISTANT ACCELEROMETER PROOF MASS

BACKGROUND OF THE INVENTION

The present invention relates to proof masses for accelerometers, and has particular relation to such proof masses which have been rendered resistant to static electricity.

An accelerometer consists of a proof mass supported equidistant between two stators. Each stator includes a permanent magnet. The proof mass includes an electromagnet, or a pair of electromagnets wired in series, one on each side of the proof mass. When the proof mass is forced by acceleration toward one of the stators, additional current is supplied to the electromagnet to keep it exactly halfway between the stators. The amount of the current supplied to the electromagnet in therefore indicative of the acceleration.

The proof mass is kept exactly halfway between the stators by plating opposite sides of the proof mass with gold, or another suitable conductor. The stators are wired together, and an ac voltage is applied to the stators, with respect to ground. The plate on each side of the proof mass interacts with the stator closest to it to form a capacitor, and the ac voltage applied to the stators causes a current to flow through each plate. If the proof mass moves toward one stator, the capacitance on that side increases, and increases the current with it. On the other side, the capacitance and current decrease. These two currents can be applied to a differential current amplifier, the output of which is applied to the coils so as to keep the proof mass at the midpoint position.

The proof mass is designed to respond only to acceleration, gravitational or otherwise. Electromagnetic forces, in particular, should have no affect on the proof mass. With magnetic forces, this can be accomplished by making the proof mass of non-magnetic materials, such as fused silica for the non-conductive portions and gold for the conductive portions. However, with fused silica and other non-conductive materials, electrostatic charges are inevitable, especially between the proof mass proper and the metalic stators. This electrostatic force cannot be differentiated from an ordinary acceleration, and produces a bias in the instrument.

Further, when the accelerometer is turned off, the proof mass rests against one or the other of the stators. In order to avoid shorting between the pickoff plate and the stator against which the proof mass rests, polyimide buttons are placed on the stator, insulating the pickoff plate from the stator. However, if one of the polyimide buttons makes contact with the fused silica, it will deposit an electrostatic charge on the fused silica, thereby restarting a long discharge period. It is possible to simply out wait the electrostatic charge, and to take whatever time is necessary to allow it to discharge. However, this ties up valuable equipment and is not cost effective in production.

SUMMARY OF THE INVENTION

It is an objective of the present invention to reduce or eliminate bias caused by static electricity, and to do so in a significantly shorter period of time than is possible using the prior art. This objective is obtained by coating the proof mass with a thin metallic film, such as chromium oxide. The film is sufficiently conductive (thick) as to allow static electricity to be drawn off in a reasonable period of time, yet is sufficiently resistive (thin) as to minimize any leakage current between the two pickoff plates.

It is a feature of the present invention that the metalic film may be applied either before or after the pickoff plates are applied to the fused silica.

It is a further feature of the present invention that the film need only be applied to the areas of the proof mass not covered by the pickoff plates, but that additionally covering the pickoff plates (or allowing the pickoff plates to additionally cover the film) will not interfere with the efficacy of the present invention.

It is an advantage of the present invention that it may be conveniently placed into effect.

It is a further advantage of the present invention that metallic films whose reliability has been established through conventional use in arts far different from that in which the present invention lies may be applied in the art of the present invention.

DETAILED DESCRIPTION OF A PREFERRED EMBODIMENT

Figure 1:
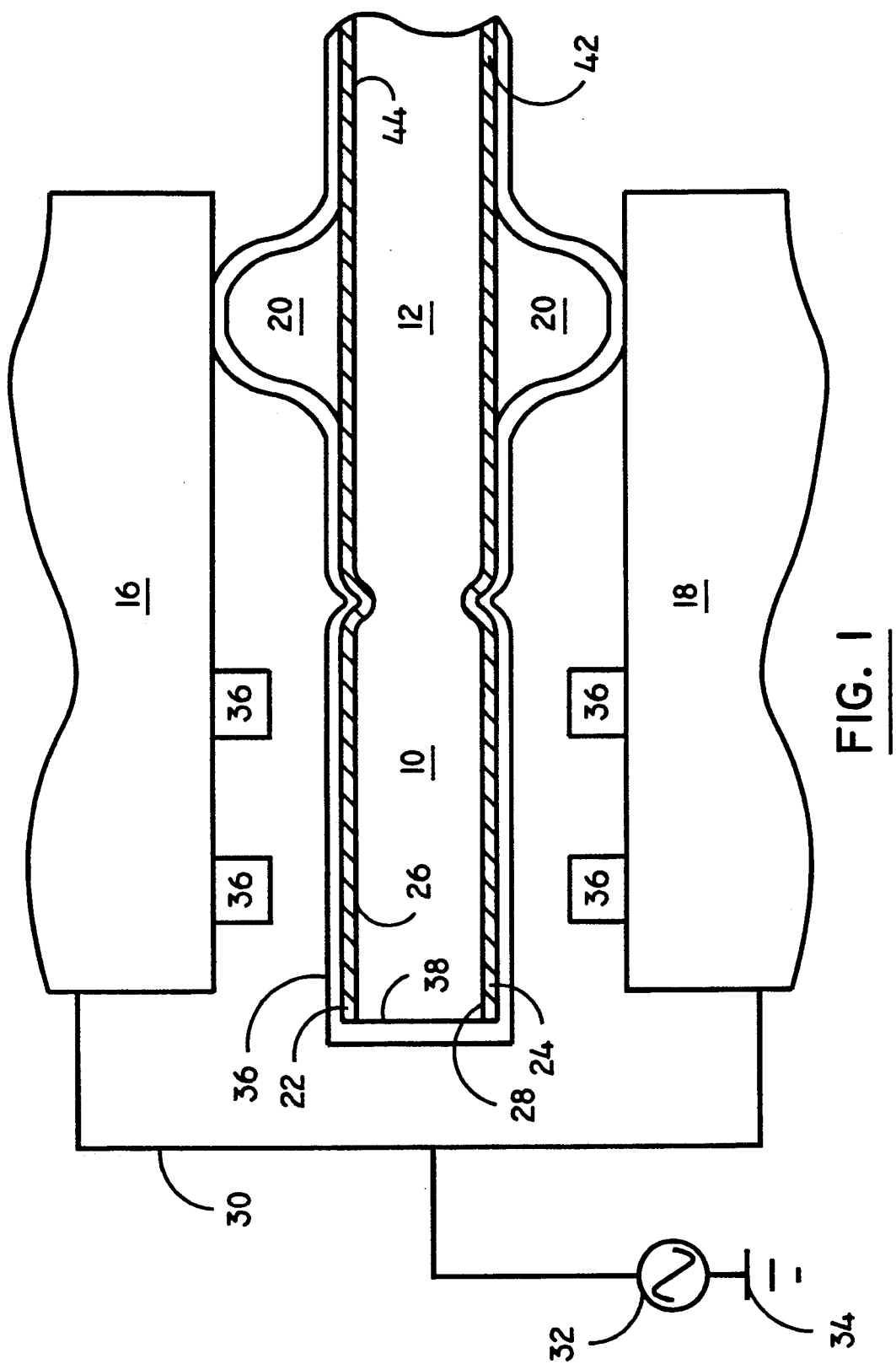
FIG. 1 is a partially schematic cross-sectional representation of the operating portion of an accelerometer using the present invention.

In FIG. 1, a dielectric, non-magnetic proof mass 10 is supported from a support 12 by a hinge 14. Support 12 is clamped between upper stator 16 and lower stator 18 by mounting pads 20. An upper pickoff plate 22 and a lower pickoff plate 24, both preferably of gold, are respectively deposited on upper surface 26 and lower surface 28 of the proof mass 10. The proof mass 10 includes a coil, and the stators 16 and 18 each include a permanent magnet, but the coil and the magnets form no part of the present invention and therefore have been omitted from FIG. 1 for clarity.

The stators 16 and 18 are preferably composed of nickel steel, such as the brand of nickel steel sold under the trademark INVAR, which has the desirable properties of good electrical conduction, good magnetizability, and low coefficient of thermal expansion. The stators 16 and 18 are connected together by an electrical conductor 30, to which is applied an ac voltage signal of suitable frequency from a generator 32, connected between the conductor 30 and ground 24. Frequencies of 20 KHz to 100 KHz have been used.

Insulating buttons 35, preferably of polyimide, prevent the pickoff plates 22 and 24 from shorting out against the stators 16 and 18.

A thin conductive film 36, preferably a metallic film such as chromium oxide, covers the entire surface of the proof mass 10 and support 12, including the pickoff plates 22 and 24. It also covers the side surface 38, defined as all of the surface of the proof mass not covered by the plates 22 and 24, or by any other conductor. It also covers the upper pickoff lead 40 leading from the upper pickoff plate 22 to the supporting electronics shown in FIG. 2. It further covers the lower pickoff lead 42 leading from the lower pickoff plate 24 to the FIG. 2 electronics. The leads 40 and 42 are shown as going under the pads 20 for simplicity, but actually go around them, since the pads 20 are integral to the support 12.

The surface 44 of the support 12 and of the mounting pad 20 may be considered to be a part of the side surface 38, since the support 12, like the proof mass 10, is preferably composed of fused silica, which readily maintains an electrostatic charge. The metallic film 36 must draw this charge from the fused silica not only from the portion of the exposed surfaces of the proof mass 10, but also from the surface 44 of the support 12.

Figure 2:
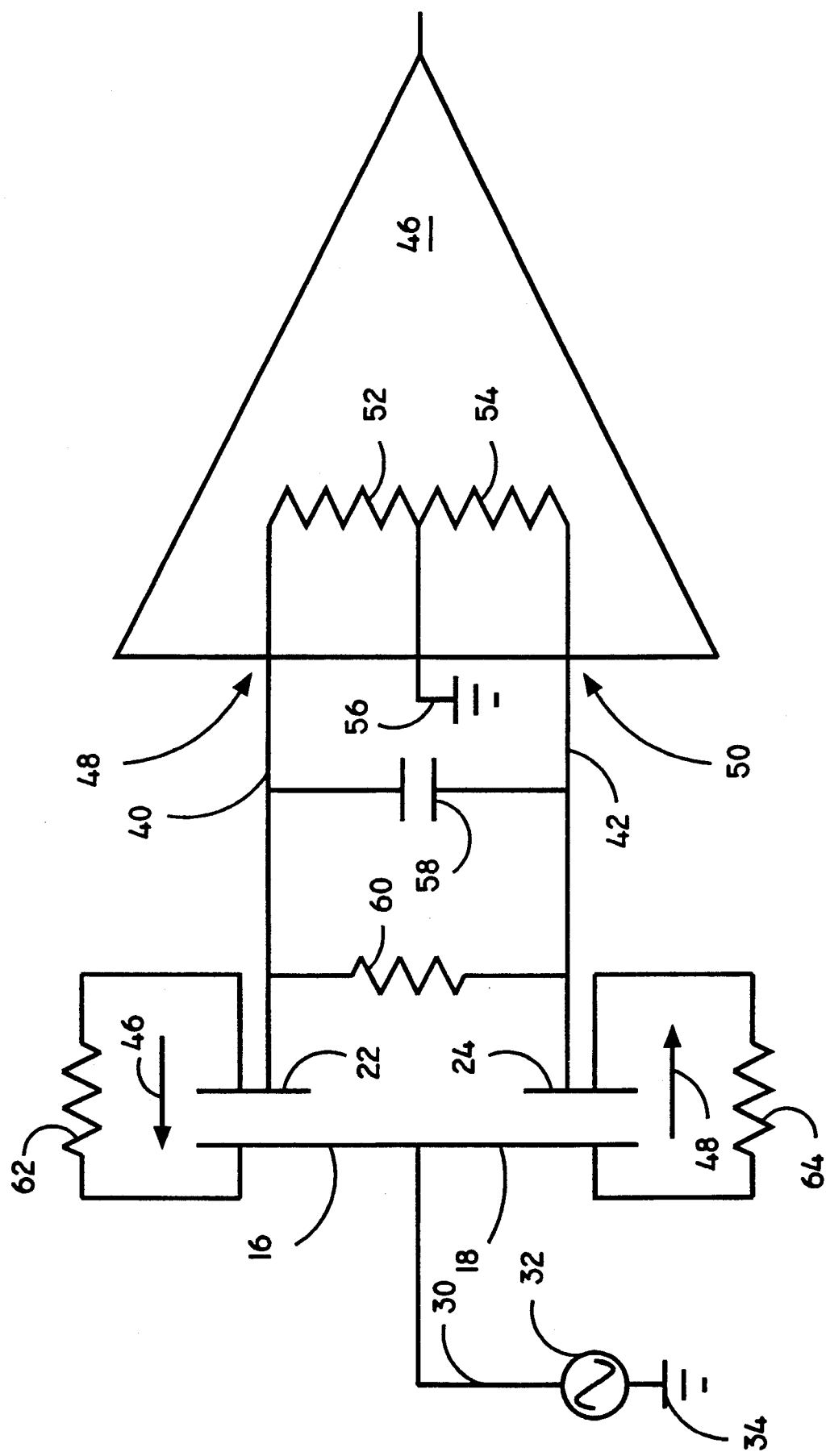
FIG. 2 is a schematic diagram of the electronics associated with an accelerometer, and demonstrating the parameters which the present invention must satisfy.

In FIG. 2, the upper stator 16 and lower stator 18, being connected together by the conductor 30, have been shown as a single plate of a capacitor. The upper pickoff plate 22 is shown as interacting with the upper portion of this single plate, while the lower pickoff plate 24 is shown as interacting with the lower portion of this single plate. If the proof mass 10 rises, the upper pickoff plate 22 will move closer to the upper stator 16, as indicated by the upper arrow 46, while the lower pickoff plate 24 will move further away from the lower stator 18, as indicated by the lower arrow 48. The reduced separation between plates 16 and 22 increases the capacitance between them, which increases the current in upper lead 40 induced by the voltage generator 32; the increased separation between plates 18 and 24 likewise reduces the capacitance between them, and reduces the current in lower lead 42.

Leads 40 and 42 are connected to a differential current amplifier 46 through an upper input terminal 48 and a lower input terminal 50, respectively. The impedance between inputs 48 and 50 comprises an upper impedance 52 and a lower impedance 54, the junction of which is grounded by a ground 56. The impedances 52 and 54 are equal, and are designed to be very low, preferably 100 ohms or less. This low impedance is necessary to minimize the effect of the parasitic capacitance 58 arising between the leads 40 and 42, so that the vast majority of the current on leads 40 and 42 passes through the impedances 52 and 54, and not through the parasitic capacitance 58.

The very small size of impedances 52 and 54 presents an opportunity to the designer, since the parasitic resistance 60 between the upper pickoff plate 22 and lower pickoff plate 24 must be made much larger than the upper and lower impedances 52 and 54, but not so much larger as to unduly extend the electrostatic discharge time. Gigohm resistances are possible if extreme accuracy is required at the expense of extended discharge time (one hour), while megohm resistances may be utilized if short discharge times (one microsecond) are desirable. Accuracy will be maintained if the films are equally conductive on both sides. Very high resistances translate into very low conductances which, since each is very close to zero, will be very close to each other. Conductances may therefore be allowed to vary from zero if they do not significantly vary from each other.

The parasitic resistance 60 is inversely proportional to the circumference of the proof mass 10, directly proportional to the thickness of the proof mass 10, and inversely proportional to the thickness of the metallic film 36. If the proof mass has a radius of 1.5 inches and a thickness of 30 mills, a metalic film 36 with a resistivity of 100 megohms per square will produce a parasitic shunt resistance 60 of approximately 2 megohms. In comparison with the 200 ohms internal to the differential amplifier 46, a 2 megohm shunt resistance would provide a rapid discharge of static electricity with acceptably small distortion to the currents passing through leads 40 and 42.

FIG. 1 shows the support 12 clamped between the stators 16 and 18 with mounting pads 20. The leads 40 and 42 are, of course, diverted away from the stators 16 and 18, but there will be a portion of the support 12 in contact with both the stators 16 and 18 and the proof mass 10. The surface 44 of this portion of the support 12 must be coated with the metallic film 36, and this coating will create an upper parasitic resistance 62 between the upper pickoff plate 22 and the upper stator 18, and will create a lower parasitic resistance 64 between the lower pickoff plate 24 and the lower stator 18. These parasitic resistances are shown on FIG. 2, and provide two additional paths to ground through the ac generator 32 for dissipation of static charge. In practice, the shunt resistances 62 and 64 will be greater than that of parasitic resistance 60. Parasitic resistance 60 must therefore be the most accurately controlled.

Figure 3:
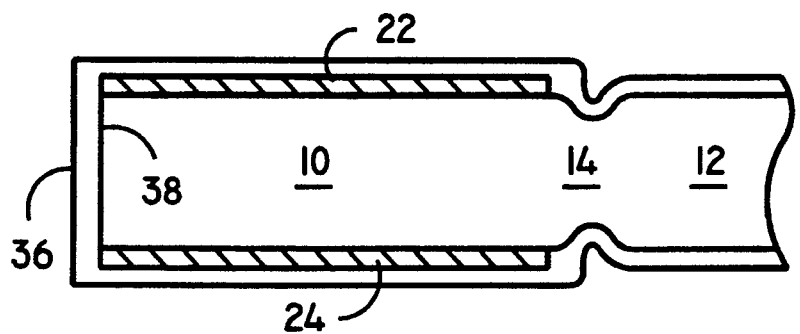
FIG. 3 is a cross section of the proof mass with the pickoff plates under the metallic film.
Figure 4:
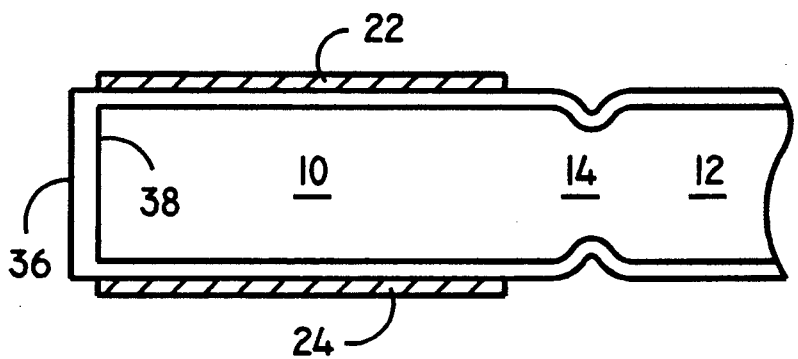
FIG. 4 is a cross section of the proof mass with the pickoff plates on the metallic film.

In the apparatus shown in FIG. 1, the pickoff plates 22 and 24 are first deposited on, that is, in top if, the proof mass 10, and a metallic film layer 36 is then deposited over the pickoff plates 22 and 24, support 12, and exposed perimeter 38. This is shown more simply in FIG. 3, with the remainder of the apparatus of FIG. 1 omitted for clarity. However, it is not necessary that the pickoff plates 22 and 24 be deposited first and the metallic film 36 be deposited later. As shown in FIG. 4, the metallic film 36 may be deposited on the entire moving mass 10 and support 12, with the pickoff plates 22 and 24 then being deposited on top of the metallic film 42.

Figure 5:
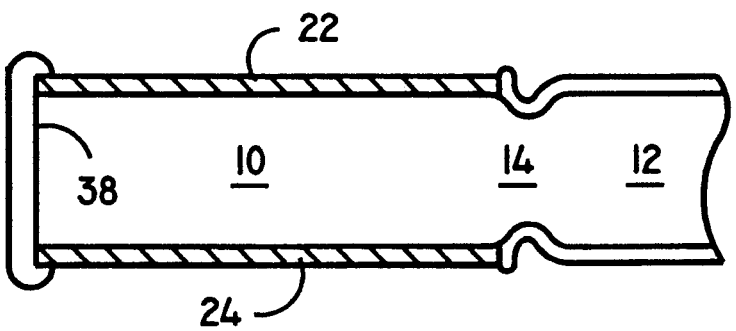
FIG. 5 is a cross section of the proof mass with the pickoff plates partially substituting for the metallic film.

Indeed, it is not even necessary that the portions of the proof mass 10 which are covered by pickoff plates 22 and 24 be additionally covered by the metallic film 36, since the pickoff plates 22 and 24 are designed to be conductive and will immediately eliminate any stray static electricity. This configuration is shown in FIG. 5, wherein only the exposed surfaces of the proof mass 10 and the support 12 are covered by the metallic film 36. In FIG. 5, the pickoff plates 22 and 24 were deposited before the metallic film 42, but this order could be reversed, if desired.

Regardless of the order in which it is applied, or the portions of the proof mass 10 and support 12 which it covers, the film 36 must be groundable. That is, it must be attached to some conductor which ultimately leads to ground. As shown in FIG. 1, proof mass 10 and support 12 are grounded through stators 16 and 18 and generator 32. They are also grounded through the pickoff plates 22 and 24 and the differential amplifier 46. The pickoff plates 22 and 24, stators 16 and 18, and differential amplifier 46 are all suitable grounding paths, but other sources of grounding will occur to those skilled in the art.

INDUSTRIAL APPLICABILITY

The present invention is capable of exploitation in industry, and can be used, whenever it is desired to remove static electricity from an accelerometer or any other device which may retain a static charge. It can be made from components which, taken separate and apart from one another, are entirely conventional, or it can be made from their nonconventional counterparts.

While a preferred embodiment of the present invention has been described herein, the true scope and spirit of the present invention is not limited thereto, but is limited only by the appended claims.

What is claimed is:

1. A static electricity resistant proof mass for an accelerometer, the accelerometer including a differential amplifier, the proof mass comprising:
    (a) a dielectric non-magnetic center having an upper surface, a lower surface, and a side surface;
    (b) an upper pickoff plate on the upper surface and connected to the differential amplifier;
    (c) a lower pickoff plate on the lower surface; and
    (d) a metal oxide conductive layer on the side surface and connected to the differential amplifier, in contact with the pickoff plates, the conductive layer being attached to a conductor which ultimately leads through a resistance to ground, and the conductive layer having an impedance between the pickoff plates which is large in comparison to the impedance through the differential amplifier.

2. The proof mass of claim 1, wherein the metal oxide comprises chromium oxide.

3. The proof mass of claim 1, further comprising:
    (a) a metal oxide conductive layer on the upper pickoff plate, the conductive layer being attached to a conductor with ultimately leads through a resistance to ground, and the conductive layer having an impedance which is large in comparison to the impedance through the differential amplifier; and
    (b) a metal oxide conductive layer on the lower pickoff plate, the conductive layer being attached to a conductor which ultimately leads through a resistance to ground, and the conductive layer having an impedance which is large in comparison to the impedance through the differential amplifier.

4. The proof mass of claim 3, wherein the metal oxide comprises chromium oxide.

5. A static electricity resistant proof mass for an accelerometer, the accelerometer including a differential amplifier, the proof mass comprising:
    (a) a dielectric non-magnetic center having an upper surface, a lower surface, and a side surface;
    (b) a metal oxide conductive layer on the upper surface, lower surface, and side surface, the conductive layer being attached to a conductor which ultimately leads through a resistance to ground
    (c) an upper pickoff plate on a portion of the conductive layer on the upper surface and connected to the differential amplifier; and
    (d) a lower pickoff plate on a portion of the conductive layer on the lower surface and connected to the differential amplifier;
wherein the conductive layer has an impedance between the pickoff plates which is large in comparison to the impedance through the differential amplifier.

6. The proof mass of claim 5, wherein the metal oxide comprises chromium oxide.

* * * * *